Figure 1:
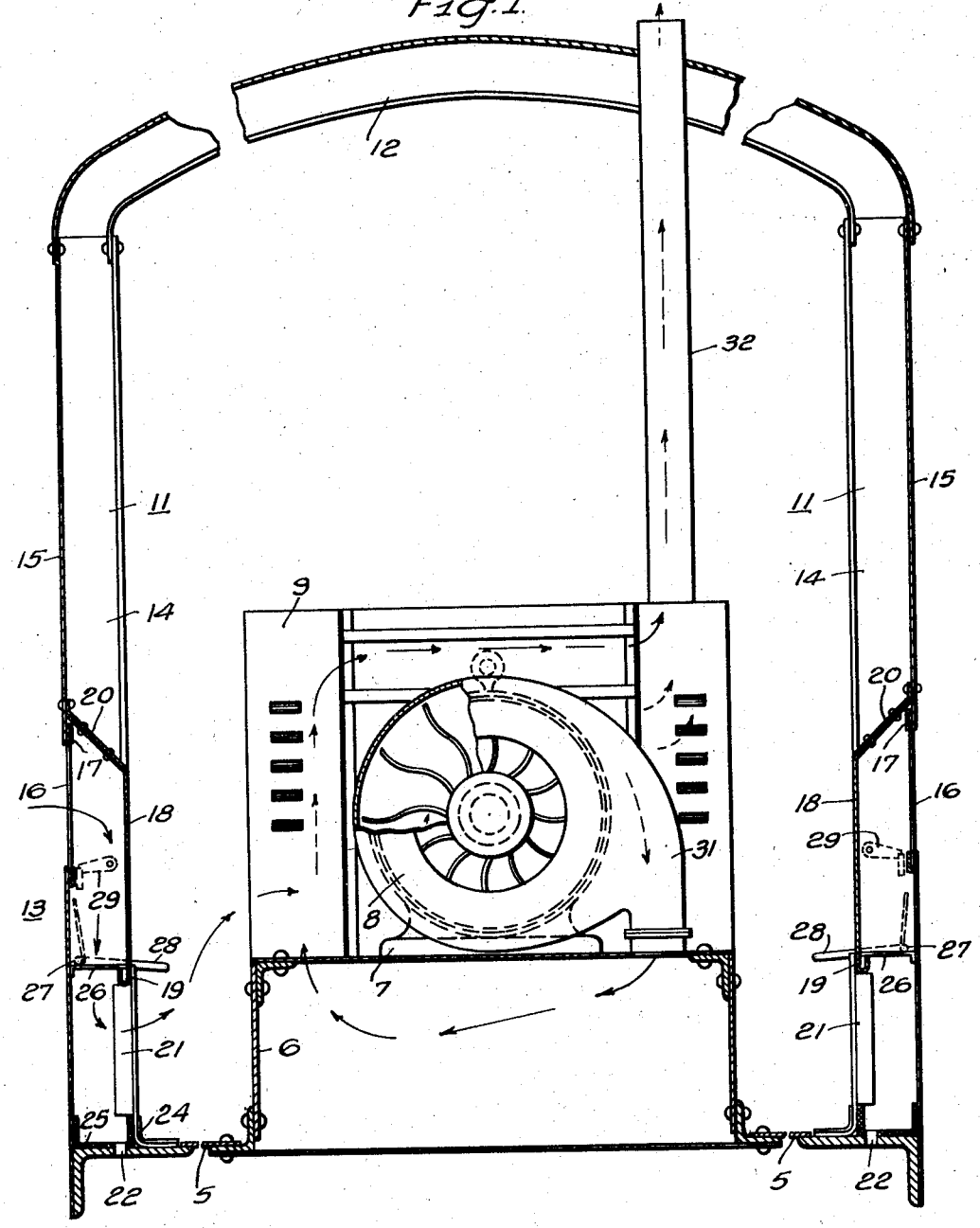

July 7, 1931.  C. C. WHITTAKER  1,813,218
VENTILATING MEANS FOR ELECTRIC RAILWAY LOCOMOTIVES
Filed June 29, 1928   2 Sheets-Sheet 1

INVENTOR
Charles C. Whittaker.
BY
ATTORNEY

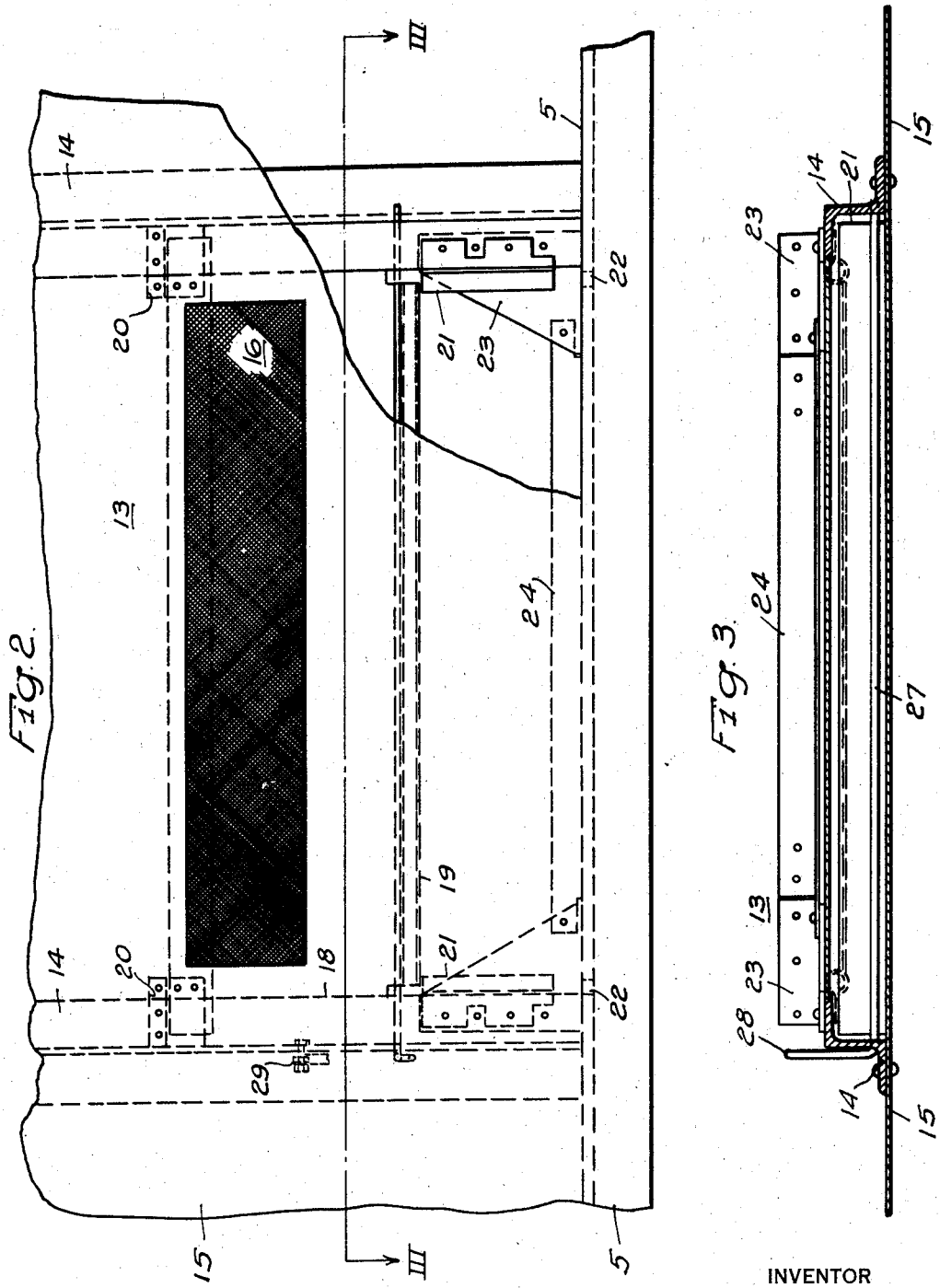

Patented July 7, 1931

1,813,218

UNITED STATES PATENT OFFICE

CHARLES C. WHITTAKER, OF PITTSBURGH, PENNSYLVANIA, ASSIGNOR TO WESTINGHOUSE ELECTRIC & MANUFACTURING COMPANY, A CORPORATION OF PENNSYLVANIA

VENTILATING MEANS FOR ELECTRIC RAILWAY LOCOMOTIVES

Application filed June 29, 1928. Serial No. 289,316.

My invention relates to ventilators and more particularly to ventilators for electric-railway-locomotive cabs.

Heretofore, ventilators for providing cooling air for the apparatus of railway-motor cabs have been of types which allowed a great deal of dirt and snow to pass into the cab, thereby decreasing the life of the electric apparatus.

A railway locomotive cab is required to operate in all conditions of weather and, at the same time, the provision of dry and clean air for ventilating purposes is necessary. Ventilators have taken the form of a screen or of an opening having louvres, and the air which was drawn into the cab was left in the same condition as the outside air; that is, the undesirable constituents were not removed.

It is an object of my invention to provide a ventilator for a locomotive cab whereby moisture and foreign particles contained in the air will be removed.

It is another object of my invention to provide a ventilator with a regulator whereby the amount of air passing into the cab may be varied.

It is a further object of my invention to provide a ventilator for a locomotive cab whereby the moisture and foreign particles of the air are thrown to the bottom of the cab, away from the electrical apparatus.

In practicing my invention, I provide a ventilator adapted to be disposed in the side wall of the locomotive cab, between any two of the frame members thereof, and an expanded-metal screen disposed in the wall, directly back of which is disposed a baffle plate upon which the moisture in the air condenses and from which the condensate is drained.

The baffle plate projects below the screen, requiring the air to pass downwardly before it is allowed to enter the cab. The air actually enters the cab near the floor, at which point it is required to make a sharp right-angle turn where, by reason of the centrifugal force and by reason of gravity, any foreign particles, such as snow and dirt, are thrown to the floor, leaving a dry, clean air for ventilating the electric apparatus.

A better understanding of my invention may be had from the following description, taken with the accompanying drawings, in which:

Figure 1 is an elevational sectional view of a locomotive cab, showing the arrangement of the apparatus therein and embodying my invention, Fig. 2 is an elevational view of my ventilator, looking from the outside of the locomotive cab, and Fig. 3 is a top plan view, partially in section, on the line III—III of Fig. 2.

In Fig. 1 is illustrated a general layout for a locomotive cab. On the floor 5 is disposed an air duct 6 constituting a bench for supporting the electric apparatus, such as a motor 7, a fan blower 8, an air-blast transformer 9 and such other apparatus as may be utilized in a railway cab. The cab also includes vertical side-walls 11 and a roof 12. In the side-walls 11, my ventilator or air-intake 13 is disposed. The side-walls of the cab include usual vertical members or Z-bars 14 with the usual metal sheeting 15. Disposed in an opening in the metal side-wall 15 is an expanded metal screen 16 which is carried by a flanged frame 17.

Immediately back of the screen is disposed a baffle plate or hood 18 extending below the screen and having a turned up trough-portion 19. The baffle plate 18 is supported from patch plates 20 carried by the Z-bars. Such moisture as may enter is condensed on the baffle plate 18 and is collected in the trough 19, from which it drains into a gutter 21, normally constructed as shown more clearly in Fig. 2, and carried by the Z-bars 14. The water, upon leaving the gutter, passes through a hole 22 in the bottom of the cab.

The bottom ends of the Z-bars 14 are supported by the usual angular gusset plates 23. A flanged piece 24 is disposed to provide a form on the floor and under the baffle plate, in which the plastic cementing material 25 may be disposed to prevent rusting.

A damper plate 26 is welded to a longitudinally-extending rod 27, carried by the two Z-bars, the edge of the damper 26 resting on the trough when the damper is closed. A handle 28 is fixed to the end of the damper rod 27 and may be used for opening and closing the damper plate.

When the damper plate is disposed in its open position, as shown in dotted lines, it is locked by a dog 29.

It will be noted that the handle projects outwardly into the aisle of the cab, to constitute a signal to the operator that the damper is closed. The operator, in passing through the usually narrow aisle, will stumble against this handle and will be constantly reminded of the position of the baffle plate. It is only desirable that this plate be closed during cold weather.

The air, entering the cab, is accelerated by the blower 8 and moves downwardly from the screen 16 at a relatively high velocity, and upon passing into the aisle of the cab, it is required to make a sharp turn. The downward velocity being very high at this point, any foreign particles, such as dirt and snow, are thrown to the floor. It will be noted that the spaces under the baffle 18 and on the side thereof toward the aisle of the cab are relatively large and unrestricted, compared to the confined space between the baffle 18 and the wall 15 of the cab, so that the lateral velocity of the air, as it makes the sharp turn to enter the cab, is relatively low, thus providing a region of relatively quiescent air, which does not carry the solid particles into the cab. The air, upon being drawn into the fan 8, is thrown off, through a diffuser 31, into a chamber formed by the bench 6, where it may be distributed to any of the apparatus for cooling purposes, such as to a transformer 9 in which it passes vertically and longitudinally and then out through a duct 32.

In designing my ventilator, I have disposed the parts in order to provide an efficient means of ventilation, whereby undesired moisture and foreign particles in the air are removed, thus providing the electric apparatus with clean air.

Various changes may be made in my invention, but it is to be undesrtood that all such modifications will be within the spirit and scope of my invention, as defined by the appended claims.

I claim as my invention:

1. In combination with a locomotive cab, an air-intake disposed in the wall thereof and comprising a screen, a baffle plate for directing the air entering said screen, the lower end thereof being turned up to provide a trough, a damper plate, a longitudinally-extending horizontal rod for pivotally supporting said damper plate, the edge of the damper plate engaging the edge of said trough when the damper plate is closed, and an operating handle for said damper plate.

2. In combination with a locomotive cab, an air-intake disposed in the wall thereof and comprising a screen, a baffle plate for redirecting the air which has entered said screen, a trough at the lower end of the baffle plate, a damper plate engaging the edge of said trough when disposed in the closed position, an operating handle for said damper plate projecting into the aisle of said cab to effect a signal and indicating a closed position, and means for locking said damper plate in its open position.

In testimony whereof, I have hereunto subscribed my name this 25th day of June, 1928.

CHARLES C. WHITTAKER.